United States Patent [19]
Weiser et al.

[11] Patent Number: 6,037,286
[45] Date of Patent: Mar. 14, 2000

[54] UV ABSORBING CONTAINER GLASS COMPOSITIONS

[75] Inventors: Steven M. Weiser, Perrysburg; James E. Fenstermacher, Maumee, both of Ohio; Joseph J. Hammel, Pittsburgh, Pa.; Robert N. Clark, Sylvania, Ohio

[73] Assignee: Owens-Brockway Glass Container Inc., Toledo, Ohio

[21] Appl. No.: 09/044,877

[22] Filed: Mar. 20, 1998

[51] Int. Cl.$^7$ .............................. C03C 3/087; C03C 4/08
[52] U.S. Cl. ............................................. 501/70; 501/905
[58] Field of Search ................... 501/70, 71, 905

[56] References Cited

U.S. PATENT DOCUMENTS

| | | | |
|---|---|---|---|
| 3,837,831 | 9/1974 | Moore | 501/70 |
| 4,253,878 | 3/1981 | Weaver et al. | 501/71 |
| 4,312,953 | 1/1982 | Mills et al. | 501/71 |
| 4,859,637 | 8/1989 | Roberts | 501/79 |
| 5,214,008 | 5/1993 | Beckwith et al. | 501/70 |
| 5,320,986 | 6/1994 | Tanaguchi et al. | 501/70 |
| 5,346,867 | 9/1994 | Jones et al. | 501/70 |
| 5,362,689 | 11/1994 | Morimoto et al. | 501/70 |
| 5,422,755 | 6/1995 | Morgan | 501/72 |
| 5,656,560 | 8/1997 | Stozel et al. | 501/70 |
| 5,776,845 | 7/1998 | Boulos et al. | 501/70 |

*Primary Examiner*—Karl Group

[57] ABSTRACT

A container glass composition that reduces U.V. light transmission below a wavelength of about 400 nanometers, the composition having melting and forming properties similar to soda-lime-silica glass and containing $SiO_2$, CaO, MgO, $K_2O$, $SO^-{}_3$, and a U.V. absorbing amount of about 0.4 to 0.8 weight percent $FeO+Fe_2O_3$, and about 2 to 4 weight percent of $MnO+MnO_2$.

16 Claims, No Drawings

UV ABSORBING CONTAINER GLASS COMPOSITIONS

The present invention relates to an ultraviolet light absorbing container glass composition containing $SiO_2$, $Al_2O_3$, $Na_2O$, CaO, MgO, $K_2O$, $SO_3$ and, preferably, about 0.4 to 0.8 weight percentage of $FeO+Fe_2O_3$ and about 2 to 3 weight percentage of $MnO+MnO2$ based on the weight of the glass composition.

BACKGROUND OF THE INVENTION

It is desirous to provide a substantially clear or a lightly tinted flint container glass composition to provide relatively clear transparent flint glass containers that absorb UV light so as to protect the liquid inside such as Champagne or wine.

As to prior art showing $Fe_2O_3$ or any amount of MnO in glass composition there are the following documents:

1. Central Glass Co. U.S. Pat. No. 5,362,689.
2. Corning (Morgan) U.S. Pat. No. 5,422,755.
3. Guardian Industries U.S. Pat. No. 5,214,008.
4. Ferro (Roberts) U.S. Pat. No. 4,859,637.
5. Chemical Composition of Container Glasses—Sharp (Table 1) 1930's.

Central Glass Co. U.S. Pat. No. 5,362,689 discloses a soda-lime-silica sheet glass composition that contains $Fe_2O_3$ (0.1–0.60) and 5–350 ppm MnO. The MnO is used in trace amounts. The ultraviolet absorbing ingredients appear to be $CeO_2$, $TiO_2$ and $SO_3$. In Column 5, lines 55–66, the addition of very small amounts of MnO are discussed and there is disclosed a prohibition against the use of larger amounts of MnO.

Coming (Morgan) U.S. Pat. No. 5,422,755 discloses a soda-potassia-silica glass composition for an ophthalmic lens. There is disclosed the use of $V_2O_5$ (1.5–3.5%) and $MnO_2$ (1–4%). The Guardian Industries U.S. Pat. No. 5,214,008 shows a soda-lime silica glass composition for a flat glass. $CeO_2$ and other UV absorbing ingredients such as $TiO_2$, $MoO_2$, $V_2O_5$ and $Fe_2O_3$ are disclosed, for instance, in Column 2, line 28–50.

Ferro (Roberts) U.S. Pat. No. 4,859,637 shows lead-free glass compositions with a U.V. absorbing material selected from the group consisting of cerium oxide, manganese oxide, iron oxide, cobalt oxide, copper oxide, vanadium oxide and molybdenum oxide. The glass is used with a ceramic pigment to form an ink composition.

The reprint "Chemical Composition of Commercial Glasses". (Sharp) shows in Table 1 some ancient soda-lime-silica glass compositions containing (0.54–0.9), $Fe_2O_3$, and low amounts (0.61–0.97) of MnO, apparently present from contamination.

OBJECTS OF THE INVENTION

It is an object of the present invention to provide a relatively transparent, clear flint container glass composition containing oxides of iron and oxides of manganese that absorb UV light to thereby protect liquids such as Champagne and wine from unwanted exposure to the UV light.

It is an object of the present invention to provide an ultraviolet light absorbing soda-lime-silica container glass composition consisting essentially of the following ingredients in approximately weight percents;

| Ingredients | Weight |
|---|---|
| $SiO_2$ | 69–74 |
| $Na_2O$ | 11–15 |
| CaO | 9–13 |
| MgO | 0.5–2 |
| $K_2O$ | 0.1–0.5 |
| $SO_3^-$ | 0.1–0.5 |
| $Fe_2O_3$ + FeO | 0.4–0.8 |
| MnO + $MnO_2$ | 2.0–3.0 |

These and the other objects will be apparent from the specification and claims that follow.

SUMMARY OF THE INVENTION

The present invention provides a soda-lime-silica container glass composition consisting essentially of the following ingredients in approximately weight percent;

| Ingredients | Weight |
|---|---|
| $SiO_2$ | 69–74 |
| $Na_2O$ | 11–15 |
| CaO | 9–13 |
| MgO | 0.005–3.0 |
| $K_2O$ | 0.005–1.0 |
| $SO_3$ | 0.1–0.5 |
| $Fe_2O_3$ + FeO | 0.3–1.0 |
| MnO + $MnO_2$ | 2.0–3.1 |

The present invention also preferably provides the following:

| Ingredients | Weight % |
|---|---|
| $SiO_2$ | 69–74 |
| $Na_2O$ | 11–15 |
| CaO | 9–13 |
| MgO | 0.5–2 |
| $K_2O$ | 0.1–0.5 |
| $SO_3$ | 0.1–0.5 |
| $Fe_2O_3$ + FeO | 0.4–0.8 |
| MnO + $MnO_2$ | 2.0–3.0 |

DETAILED DESCRIPTION OF THE INVENTION

The following examples illustrate the present invention.

EXAMPLE 1

A UV absorbing flint container glass composition was made by mixing raw batch ingredients including quartz, soda ash, sodium nitrate, potassium carbonate, alumina, sodium sulfate, iron oxides and manganese oxides and melting the batch to provide a container glass composition (BDB-1) containing the following ingredients, in approximate percentage by weight:

| Ingredients | Percentage by weight: |
| --- | --- |
| $Cl_2$ | 0.0043 |
| $Na_2O$ | 13.4096 |
| $K_2O$ | 0.3412 |
| MgO | 0.0053 |
| CaO | 11.0386 |
| $MnO + MnO_2$ | 2.0070 |
| SrO | 0.0020 |
| BaO | 0.0005 |
| $Al_2O_3$ | 8.6059 |
| $Fe_2O_3 + FeO$ | 0.4015 |
| $SiO_2$ | 70.8110 |
| $SO_3$ | 0.3714 |

The glass was melted at 2700° F. for about 6¼ hours in a gas furnace with excess air and an oxidizable batch atmosphere. The glass can be processed like a soda-lime silica glass and it absorbs ultra violet light.

The amount of each raw batch material for Example 1 is as follows:

Composition - DBD-1

| Raw Materials | GRAMS |
| --- | --- |
| Quartz | 354.26 |
| Soda Ash | 112.81 |
| Sodium Nitrate | 3.54 |
| Calcium Carbonate | 96.14 |
| Magnesium Carbonate | 2.50 |
| Alumina | 1.91 |
| Calcium Sulphate | 3.04 |
| Iron Oxides | 1.97 |
| Manganese Oxides | 12.32 |

EXAMPLE 2

Following the procedure of Example 1, additional melts D-1, D-2, D-3, D-4, D-5 and D-6 were made according to Table 1 below.

TABLE 1

EVALUATION OF 0.4, 0.6 and 0.8% $Fe_2O_3$ at 2.0 and 3.0% MANGANESE OXIDE LEVELS

| | MELT D-1 | MELT D-2 | MELT D-3 | MELT D-4 | MELT D-5 | MELT D-6 |
| --- | --- | --- | --- | --- | --- | --- |
| $SiO_2$ | 71.05 | 70.85 | 70.65 | 70.05 | 69.85 | 69.65 |
| $Na_2O$ | 13.36 | 13.36 | 13.36 | 13.36 | 13.36 | 13.36 |
| CaO | 11.00 | 11.00 | 11.00 | 11.00 | 11.00 | 11.00 |
| $K_2O$ | 0.34 | 0.34 | 0.34 | 0.34 | 0.34 | 0.34 |
| $Al_2O_3$ | 1.60 | 1.60 | 1.60 | 1.60 | 1.60 | 1.60 |
| $SO_3$ | 0.25 | 0.25 | 0.25 | 0.25 | 0.25 | 0.25 |
| $Fe_2O_3$ | 0.40 | 0.60 | 0.80 | 0.40 | 0.60 | 0.80 |
| MnO | 2.00 | 2.00 | 2.00 | 3.00 | 3.00 | 3.00 |
| $NaNO_3$ | 10#/1000# Sand | 10#/1000# Sand | 10#/1000# Sand | 10#/1000# Sand | 10#/1000# Sand | 10#/1000# Sand |

COMMENTS:
1) Melt D-1 uses 0.40 wt % Fe2O3 and 2.0% manganese oxide (5.64:1 molar ratio of Mn to Fe)
2) Melt D-2 uses 0.60 wt % Fe2O3 and 2.0% manganese oxide (3.71:1 molar ratio of Mn to Fe)
3) Melt D-3 uses 0.80 wt % Fe2O3 and 2.0% manganese oxide (2.82:1 molar ratio of Mn to Fe)
4) Melt D-4 uses 0.40 wt % Fe2O3 and 3.0% manganese oxide (8.46:1 molar ratio of Mn to Fe)
5) Melt D-5 uses 0.60 wt % Fe2O3 and 3.0% manganese oxide (5.57:1 molar ratio of Mn to Fe)
6) Melt D-6 uses 0.80 wt % Fe2O3 and 3.0% manganese oxide (4.23:1 molar ratio of Mn to Fe)

The glass composition of Example 1 (DBD-1) and Example 2 (D1 through D6) were tested and found to reduce the transmission of ultraviolet light and in addition, possess melting and forming properties similar to commercially feasible soda-lime glass.

U.V. glass analyses for melts D1 through D6 (Example 2) are as follows:

U.V. Glass DOE Analysis For 'D' Series Melts

The measured values for dominant wavelength, brightness, and purity for the D series glass melts were analyzed with an ANOVA Program to determine any significant effect, the percent contribution and test validity. The following table summarizes the results from these tests:

Details of the U.V. absorption form melts D1, D2, D3, D4, D5, and D6 are as follows:

| Melt | Dominant Wavelength | % Brightness | % Purity |
| --- | --- | --- | --- |
| D1 | 580.1 | 20.47 | 75.2 |
| D3 | 565.9 | 16.6 | 70.8 |
| D4 | 639.0 | 0.02 | 100.0 |
| D6 | 572.7 | 11.45 | 85.9 |

Extra melts:

| | | | |
| --- | --- | --- | --- |
| D2 | 569.8 | 24.73 | 67.5 |
| D5 | 577.7 | 15.19 | 87.2 |

The attached three sheets show the ANOVA results. The conclusions are:

1. Dominant wavelength:

Significant constituents:   Mn 12%   Fe 28%
   Error 60% = marginal test (0–60% good, 60–80% marginal, >80% poor)

2. Brightness:

Significant constituents:   Mn 51%
   Insignificant

-continued

Error 60% = marginal test (0–60% good, 60–80% marginal, >80% poor)
3. Purity:

Significant constituents: Mn 74% Fe 12%
Error 14% = good test

ANOVA Table - Raw Data (D1 thru D6 Series)

| Source | Pool | Df | S | V | F | S' | rho % |
|---|---|---|---|---|---|---|---|
| MNO | [N] | 1 | 398.003 | 398.003 | 16.920 | 374.480 | 73.85 |
| FE | [N] | 1 | 85.562 | 85.562 | 3.637 | 62.040 | 12.23 |
| ERR | [Y] | 1 | 23.523 | 23.523 | | | |
| e1 | [N] | 0 | 0.000 | | | | |
| e2 | [N] | 0 | 0.000 | | | | |
| (e) | | 1 | 23.523 | 23.523 | | 70.568 | 13.92 |
| Total | | 3 | 507.087 | 169.029 | | | |

ANOVA Table - Raw Data (D1 thru D6)

| Source | Pool | Df | S | V | F | S' | rho % |
|---|---|---|---|---|---|---|---|
| MN | [N] | 1 | 157.001 | 157.001 | 4.184 | 119.478 | 51.49F |
| E | [Y] | 1 | 12.320 | 12.320 | | | |
| ERR | [Y] | 1 | 62.726 | 62.726 | | | |
| e1 | [N] | 0 | 0.000 | | | | |
| e2 | [N] | 0 | 0.000 | | | | |
| (e) | | 2 | 75.046 | 37.523 | | 112.570 | 48.51 |
| Total | | 3 | 232.047 | 77.349 | | | |

ANOVA Table - Raw Data (D1 thru D6)

| Source | Pool | Df | S | V | F | S' | rho % |
|---|---|---|---|---|---|---|---|
| MN | [N] | 1 | 1079.123 | 1079.123 | 1.590 | 400.519 | 1186 |
| FE | [N] | 1 | 1620.060 | 1620.060 | 2.387 | 941.457 | 27.87 |
| ERR | [Y] | 1 | 678.603 | 678.603 | | | |
| e1 | [N] | 0 | 0.000 | | | | |
| e2 | [N] | 0 | 0.000 | | | | |
| (e) | | 1 | 678.603 | 678.603 | | 2035.810 | 60.27 |
| Total | | 3 | 3377.786 | 1125.929 | | | |

The useful Mn to Fe ratio is one that minimizes color and maximizes U.V. absorption. For example, D-1 (Mn/Fe=5.64/1) has a hint of yellow or amber. A small amount of cobalt could be used resulting in a slight green color. D-2 has slightly better U.V. protection and has a faint or slight green-yellow color (Mn/Fe=3.71/1). D-3 (Mn/Fe=2.82/1) has slightly better U.V. protection than does D-2 and is slightly green. D-4 is faintly purple (excess $Mn^{+3}$) and a ratio=8.46/1. D-5 approximates D-3 in U.V. protection, ratios=5.57/1. D-6 has poor U.V. protection, and has a slightly darker green-yellow tint ratio=4.23/1.

The Mn/Fe ratio generally can be from about 2.8/1 to about 6.5/1. The best results generally are about 5.2/1 to 5.8/1 for the Mn/Fe ratio.

Manganese oxide is added to oxidize the iron to the +3 state which is the UV absorbing ingredient. $Mn^{+3}$ is a purple color in glass but becomes colorless in the +2 state as the iron is oxidized.

What we claim is:

1. A soda-lime-silica container glass composition consisting essentially of the following ingredients in weight percents;

| Ingredients | Weight |
|---|---|
| $SiO_2$ | 69–74 |
| $Na_2O$ | 11–15 |
| CaO | 9–13 |
| MgO | 0.005–3.0 |
| MgO | 0.005–3.0 |
| $K_2O$ | 0.005–1.0 |
| $SO_3$ | 0.1–0.5 |
| $Fe_2O_3$ + FeO | 0.3–1.0 |
| $MnO + MnO_2$ | 2.2–2.8. |

2. A composition as defined in claim 1 in which in the UV absorption is from 290 to 390 nm.

3. A composition as defined in claim 1 in which the $MnO+MnO_2$ is about 2.6 wt. percent.

4. A composition as defined in claim 1 in which the amount of $MnO+MnO_2$ is about 2.4 to 2.6 wt. percent.

5. A composition as defined in claim 1 in which $FeO+Fe_2O_3$ is about 0.6 wt. percent and $MnO+MnO_2$ is about 2 to 3 wt. percent.

6. A glass container made of the glass composition of claim 1.

7. A clear soda-lime silica flint glass container made from a glass composition that absorbs UV light and consists essentially of the following ingredients in approximate weight percents:

| Ingredients | Weight |
|---|---|
| $SiO_2$ | 69–74 |
| $Na_2O$ | 11–15 |
| CaO | 9–13 |
| MgO | 0.5–2 |
| $K_2O$ | 0.1–0.5 |
| $SO_3$ | 0.1–0.5 |
| $Fe_2O_3$ + FeO | 0.4–0.8 |
| $MnO + MnO_2$ | 2.0–3.0. |

8. A clear transparent soda-lime-silica flint glass container made from a glass composition consisting essentially of the following ingredients in weight percents;

| Ingredients | Weight |
|---|---|
| $SiO_2$ | 69–74 |
| $Na_2O$ | 11–15 |
| CaO | 9–13 |
| MgO | 0.005–3.0 |
| $K_2O$ | 0.005–1.0 |
| $SO_3$ | 0.1–0.5 |
| $Fe_2O_3$ + FeO | 0.3–1.0 |
| $MnO + MnO_2$ | 2.0–3.1 | to thereby provide a clear transparent container that absorbs UV light to prevent damage to its contents.

9. A container as defined in claim 8 in which at least about 80 wt % of the total iron content is in the ferric state.

10. A container as defined in claim 8 in which the amount of $MnO+MnO_2$ is about 2.2 to 2.8 wt. percent.

11. A container as defined in claim 8 in which the amount of $MnO+MnO_2$ is about 2.4 to 2.6 wt. percent.

12. A container as defined in claim 8 in which the total initial iron content is expressed as $Fe_2O_3$ and FeO and the wt. ratio of $Fe^{2+}/Fe^{3+}$ is about 0.3/1 to 0.1/1.

13. A container as defined in claim 8 in which $FeO+Fe_2O_3$ is about 0.6 wt. percent and the amount of $MnO+MnO_2$ is about 2 to 3 wt. percent.

14. A container is defined in claim 8 in which the UV absorption is from about 290 to 390 nm.

15. A composition as defined in claim 1 in which the $Fe_2O_3$ is present as at least about 80% wt. of the $Fe_2O_3$ and FeO ingredient.

16. A composition as defined in claim 1 in which the iron content is expressed as $Fe_2O_3$ and FeO and the wt. ratio of $Fe^{2+}/Fe^{3+}$ is about 0.3/1 to 0.1/1.

* * * * *